US012613783B2

(12) United States Patent
  Yadav et al.

(10) Patent No.: US 12,613,783 B2
(45) Date of Patent: Apr. 28, 2026

(54) ENABLING RESTORATION OF VIRTUAL MACHINE WHEN BACKUP CONTAINS ABNORMAL PORTIONS

(71) Applicant: Dell Products L.P., Round Rock, TX (US)

(72) Inventors: Sunil Yadav, Bengaluru (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,460

(22) Filed: Jul. 26, 2024

(65) Prior Publication Data

US 2026/0030119 A1    Jan. 29, 2026

(51) Int. Cl.
  *G06F 11/1446*      (2026.01)
  *G06F 9/455*      (2018.01)

(52) U.S. Cl.
  CPC ...... *G06F 11/1469* (2013.01); *G06F 9/45558* (2013.01); *G06F 2009/45583* (2013.01); *G06F 2201/815* (2013.01)

(58) Field of Classification Search
  CPC ............. G06F 11/1469; G06F 9/45558; G06F 2009/45583; G06F 2201/815
  See application file for complete search history.

(56) References Cited

U.S. PATENT DOCUMENTS

| | | | |
|---|---|---|---|
| 8,732,479 B1 | 5/2014 | Henriksen | |
| 9,026,499 B1 | 5/2015 | Rajimwale et al. | |
| 9,940,460 B1 * | 4/2018 | Derbeko ............. | G06F 11/1458 |
| 11,256,574 B1 | 2/2022 | Reddy et al. | |
| 12,210,416 B1 | 1/2025 | Yadav et al. | |
| 2018/0018218 A1 * | 1/2018 | Rat ..................... | G06F 11/1435 |
| 2019/0250991 A1 | 8/2019 | Lee et al. | |
| 2020/0104216 A1 | 4/2020 | Wang et al. | |
| 2021/0117542 A1 | 4/2021 | Bastide et al. | |
| 2021/0303413 A1 | 9/2021 | Chopra et al. | |
| 2021/0334001 A1 | 10/2021 | Chaturvedi et al. | |
| 2022/0043717 A1 | 2/2022 | Yadav | |
| 2022/0092184 A1 | 3/2022 | Trim et al. | |
| 2022/0358215 A1 * | 11/2022 | Shachar ................ | G06F 21/562 |
| 2022/0398170 A1 * | 12/2022 | Yadav ................. | G06F 11/1451 |
| 2023/0205636 A1 | 6/2023 | Yadav et al. | |
| 2024/0028488 A1 | 1/2024 | Balcha et al. | |

(Continued)

*Primary Examiner* — Tony Wu

(74) *Attorney, Agent, or Firm* — Chamberlain, Hrdlicka, White, Williams & Aughtry; Aly Z. Dossa

(57) ABSTRACT

A method for enhancing backup and recovery of a virtual machine, including receiving, in connection with a backup operation, a metadata database and a backup image of the virtual machine. The method also includes making a first determination, based on the metadata database, that a portion of the backup image includes an anomaly, rewriting, in response to the first determination, the portion of the backup image to obtain a modified backup image, storing rewrite details in the metadata database to obtain a modified metadata database, and, after the storing, receiving a request to initiate a recovery operation for a host, providing the modified backup image and the modified metadata database to the host, mounting, at the host, the modified backup image, and performing a recovery operation for the virtual machine on the host using the modified metadata database and the modified backup image.

13 Claims, 8 Drawing Sheets

(56)          References Cited

U.S. PATENT DOCUMENTS

| | | |
|---|---|---|
| 2024/0028720 A1 | 1/2024 | Luniya |
| 2024/0103984 A1 | 3/2024 | Yadav et al. |
| 2024/0111633 A1 | 4/2024 | Yadav et al. |

* cited by examiner

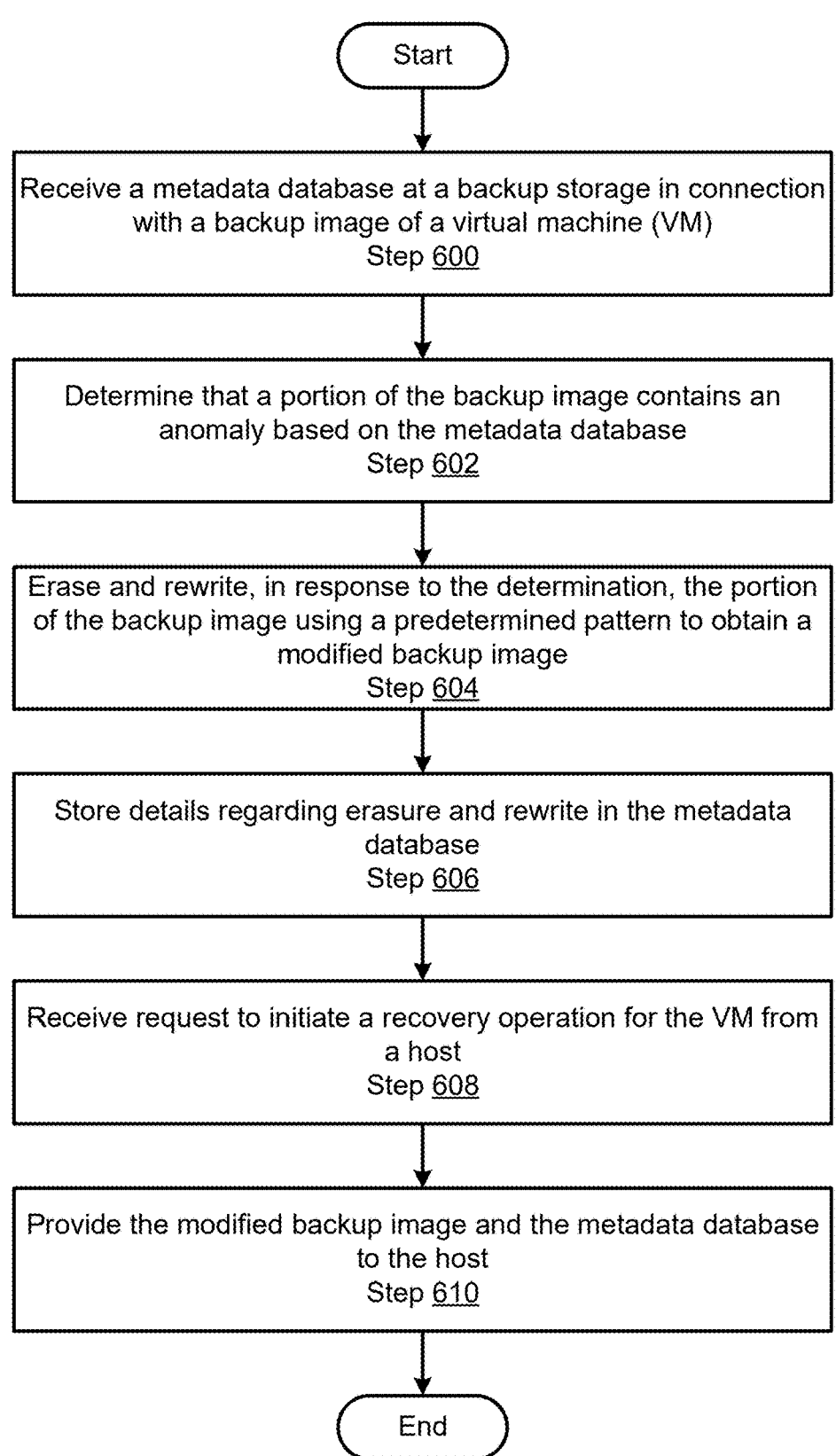
FIG. 6.1

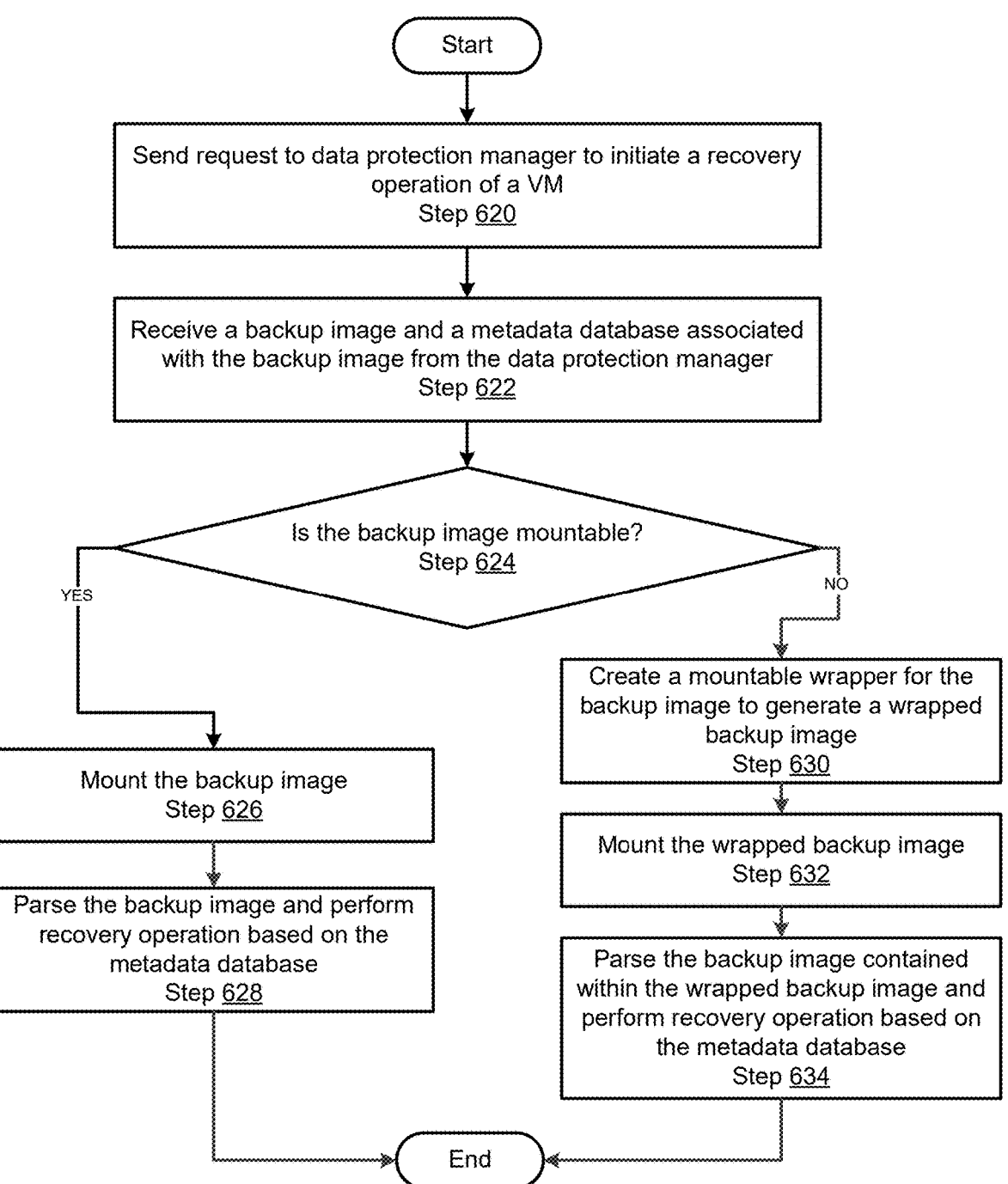
FIG. 6.2

ENABLING RESTORATION OF VIRTUAL MACHINE WHEN BACKUP CONTAINS ABNORMAL PORTIONS

BACKGROUND

Virtual machines (VMs) are capable of hosting multiple types of applications and user data. Host or image based data protection backup an entire image of the virtual machine as is. There may be scenarios in which the backup contains content that would corrupt or otherwise degrade a recovery operation using the backup. In certain scenarios, it may be beneficial to backup additional information about the VM to enable more secure backup images.

SUMMARY

In general, certain embodiments described herein relate to a method for enhancing backup and recovery of a virtual machine, including receiving, in connection with a backup operation, a metadata database and a backup image of the virtual machine. The method also includes making a first determination, based on the metadata database, that a portion of the backup image includes an anomaly. The method further includes rewriting, in response to the first determination, the portion of the backup image to obtain a modified backup image. In addition, the method includes storing rewrite details in the metadata database to obtain a modified metadata database. Moreover, the method includes, after the storing, receiving a request to initiate a recovery operation for a host, providing the modified backup image and the modified metadata database to the host, mounting, at the host, the modified backup image, and performing a recovery operation for the virtual machine on the host using the modified metadata database and the modified backup image.

In general, certain embodiments described herein relate to a method for enhancing backup and recovery of a virtual machine, including receiving, in connection with a backup operation, a metadata database and a backup image of the virtual machine. The method also includes making a first determination, based on the metadata database, that a portion of the backup image includes an anomaly. The method further includes rewriting, in response to the first determination, the portion of the backup image to obtain a modified backup image. In addition, the method includes storing rewrite details in the metadata database to obtain a modified metadata database. Moreover, the method includes, after the storing, receiving a request to initiate a recovery operation for a host and providing the modified backup image and the modified metadata database to the host, where the modified backup image and the modified metadata database are usable to perform the recovery operation for the virtual machine on the host.

In general, certain embodiments described herein relate to a non-transitory computer readable medium including computer readable program code, which when executed by a computer processor, enables the computer processor to perform a method for efficient backup and recovery of a virtual machine, the method including receiving, in connection with a backup operation, a metadata database and a backup image of the virtual machine. The method also includes making a first determination, based on the metadata database, that a portion of the backup image includes an anomaly. The method further includes rewriting, in response to the first determination, the portion of the backup image to obtain a modified backup image. In addition, the method includes storing rewrite details in the metadata database to obtain a modified metadata database. Moreover, the method includes, after the storing, receiving a request to initiate a recovery operation for a host and providing the modified backup image and the modified metadata database to the host, where the modified backup image and the modified metadata database are usable to perform the recovery operation for the virtual machine on the host.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations disclosed herein by way of example and are not meant to limit the scope of the claims.

FIG. 6.1 shows a flowchart of a method for performing data protection services in accordance with one or more embodiments disclosed herein.

FIG. 6.2 shows a flowchart of a method for performing a recovery operation in accordance with one or more embodiments disclosed herein.

DETAILED DESCRIPTION

Figure 1:
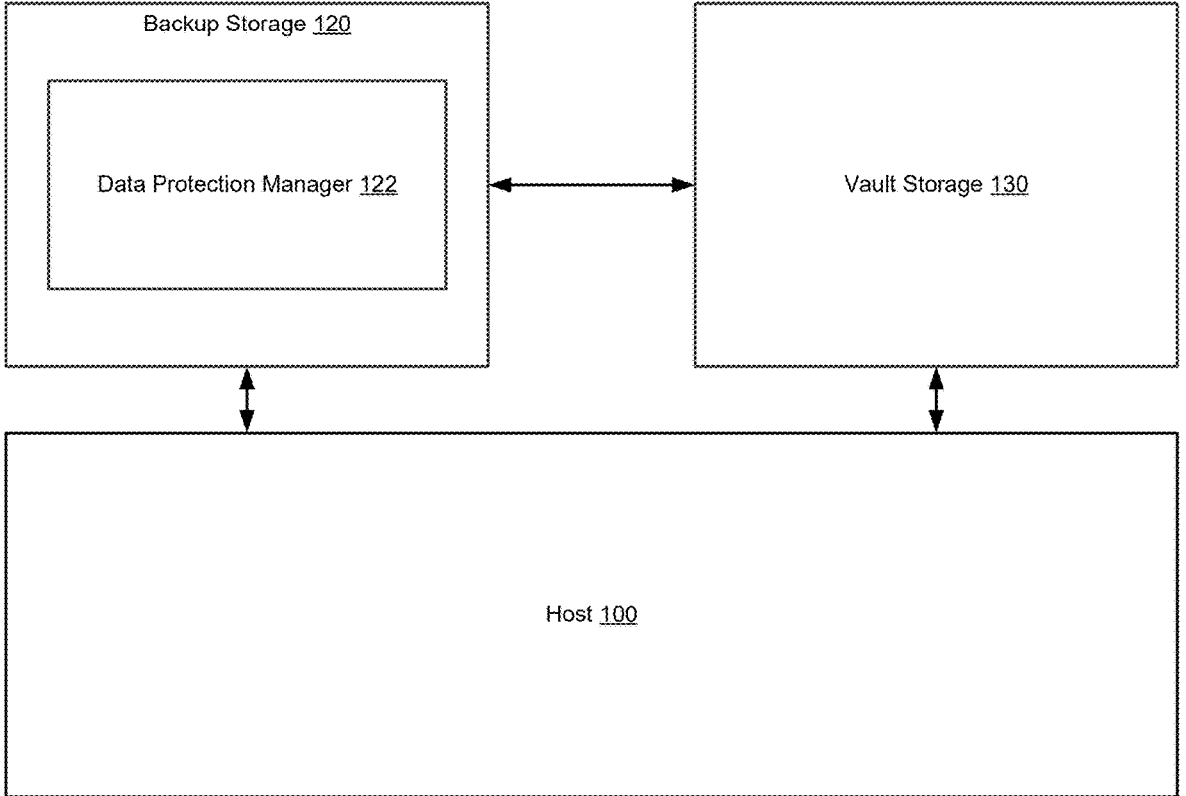
FIG. 1 shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to methods, systems, and/or non-transitory computer readable mediums for splitting image backups into multiple backup copies.

Virtual machines (VMs) are capable of hosting multiple types of applications and user data. Host or image based data protection backup an entire image of an asset as-is. As such, certain implementations of a backup of a virtual machine views the entire backup as a single file. There may be scenarios in which the backup does not capture certain information about each of the applications being backed up and may be considered application agnostic. In such scenarios, it is difficult and/or impossible to perform certain actions on the backup image to ensure the integrity of the backup image or perform other operation using the backup image. In certain scenarios, it may be beneficial to backup additional information about the applications whose data is included in the backup.

To address, at least in part, the aforementioned issues discussed above, embodiments disclosed herein relate to systems, methods, and/or non-transitory computer readable mediums that enable including additional information within the package of data included as part of a backup operation, such as which applications are included in a backup, which data the applications are using, which users are associated with the applications, where the identified data is located within the backup image, and many other details about the applications and data utilized by the VM being backed up. Including this additional information with the package of data included within the backup enables further and more customized operations on the backup image. As a result, the quality, reliability, and efficiency of backup and recovery operations are greatly enhanced.

FIG. 1 shows a diagram a system in accordance with one or more embodiments disclosed herein. The system may include a host (100), a backup storage (120), and a vault storage (130). The components of the system illustrated in FIG. 1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1 is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 4-6.2. The host (100) may be implemented using other types of computing devices without departing from the embodiments disclosed herein. For additional details regarding computing devices, refer to FIG. 7.

The host (100) may be implemented using logical devices without departing from the embodiments disclosed herein. For example, the host (100) may include VMs that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The computer implemented services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backup images and backup metadata to the backup storage (120), and performing backup and recovery operations in conjunction with the backup storage (120) and/or the vault storage (130). The local data protection services may include other and/or additional services without departing from embodiments disclosed herein. The host (100) may include the functionality to perform all, or a portion of, the methods discussed in FIGS. 4-6.2. The host (100) may include other and/or additional functionalities without departing from embodiments disclosed herein. For additional information regarding the host, refer to FIG. 2.

In one or more embodiments, the backup storage (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS. 4-6.2. The backup storage (120) may be implemented using other types of computing devices without departing from the embodiments disclosed herein. For additional details regarding computing devices, refer to FIG. 7.

The backup storage (120) may be implemented using logical devices without departing from the embodiments disclosed herein. For example, the backup storage (120) may include virtual machines that utilize computing resources of any number of physical computing devices to provide the functionality of the backup storage (120). The backup storage (120) may be implemented using other types of logical devices without departing from the embodiments disclosed herein.

In one or more embodiments, the backup storage (120) may include the functionality to, or otherwise be programmed or configured to, obtain and store backups generated on the host (100). The backup storage (120) may also include the functionality to provide all, or a portion, of the backups stored on the backup storage (120) to the host (100) for recovery operations, perform cyber recovery operations on backup images, and/or provide backup images to the vault storage (130). The backup storage (120) may include the functionality to perform all, or a portion, of the methods discussed in FIGS. 4-6.2. The backup storage (120) may include other and/or additional functionalities without departing from embodiments disclosed herein.

In one or more embodiments disclosed herein, the backup storage (120) may include one or more backup storages. The backup storage (120) may include any quantity of backup storages without departing from embodiments disclosed herein. In one or more embodiments, a backup storage of the backup storage (120) may include a backup storage type. The backup storage (120) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the backup storage (120) without departing from embodiments disclosed herein.

In one or more embodiments, the data protection manager (122) may be included as part of the backup storage (120), as a standalone device, and/or as a distributed device. In one or more embodiments, the data protection manager (122) is implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 4-6.2. The data protection manager (122) may be implemented using other types of computing devices without departing from embodiments disclosed herein. For additional details regarding computing devices, refer to FIG. 7.

In one or more embodiments, the data protection manager (122) may be implemented using logical devices without departing from embodiments disclosed herein. For example, the data protection manager (122) may include virtual machines that utilize computing resources of any number of physical computing devices to provide the functionality of the data protection manager (122). The data protection manager (122) may be implemented using other types of logical devices without departing from the embodiments disclosed herein.

In one or more embodiments, the data protection manager (122) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups and/or data included within the backups, (iii) performing cyber recovery operations on backup images, and (iv) performing recovery operations to recover backups from the backup storage (120) and/or the vault storage (130) to the host (100).

The data protection management services may include other and/or additional services without departing from embodiments disclosed herein. The data protection manager (122) may include the functionality to perform all, or a portion of, the methods of FIGS. 4-6.2. The data protection manager (122) may include other and/or additional functionalities without departing from embodiments disclosed herein. For additional information regarding the data protection manager (122), refer to FIG. 3.

In one or more embodiments, the vault storage (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS. 4-6.2. The vault storage (130) may be implemented using other types of computing devices without departing from the embodiments disclosed herein. For additional details regarding computing devices, refer to FIG. 7.

The vault storage (130) may be implemented using logical devices without departing from the embodiments disclosed herein. For example, the vault storage (130) may include virtual machines that utilize computing resources of any number of physical computing devices to provide the functionality of the vault storage (130). The vault storage (130) may be implemented using other types of logical devices without departing from the embodiments disclosed herein.

In one or more embodiments, the vault storage (130) may include the functionality to, or otherwise be programmed or configured to, obtain and store backups from the backup storage (120). For example, the vault storage (130) may be utilized as a long-term, secure, and/or reliable storage system that has less functionality than the backup storage (120). The vault storage (130) may include the functionality to perform all, or a portion, of the methods discussed in FIGS. 4-7. The vault storage (130) may include other and/or additional functionalities without departing from embodiments disclosed herein.

In one or more embodiments disclosed herein, the vault storage (130) may include one or more backup storages. The vault storage (130) may include any quantity of backup storages without departing from embodiments disclosed herein. In one or more embodiments, a backup storage of the vault storage (130) may include a backup storage type. The vault storage (130) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the vault storage (130) without departing from embodiments disclosed herein.

Although the system of FIG. 1 is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 2:
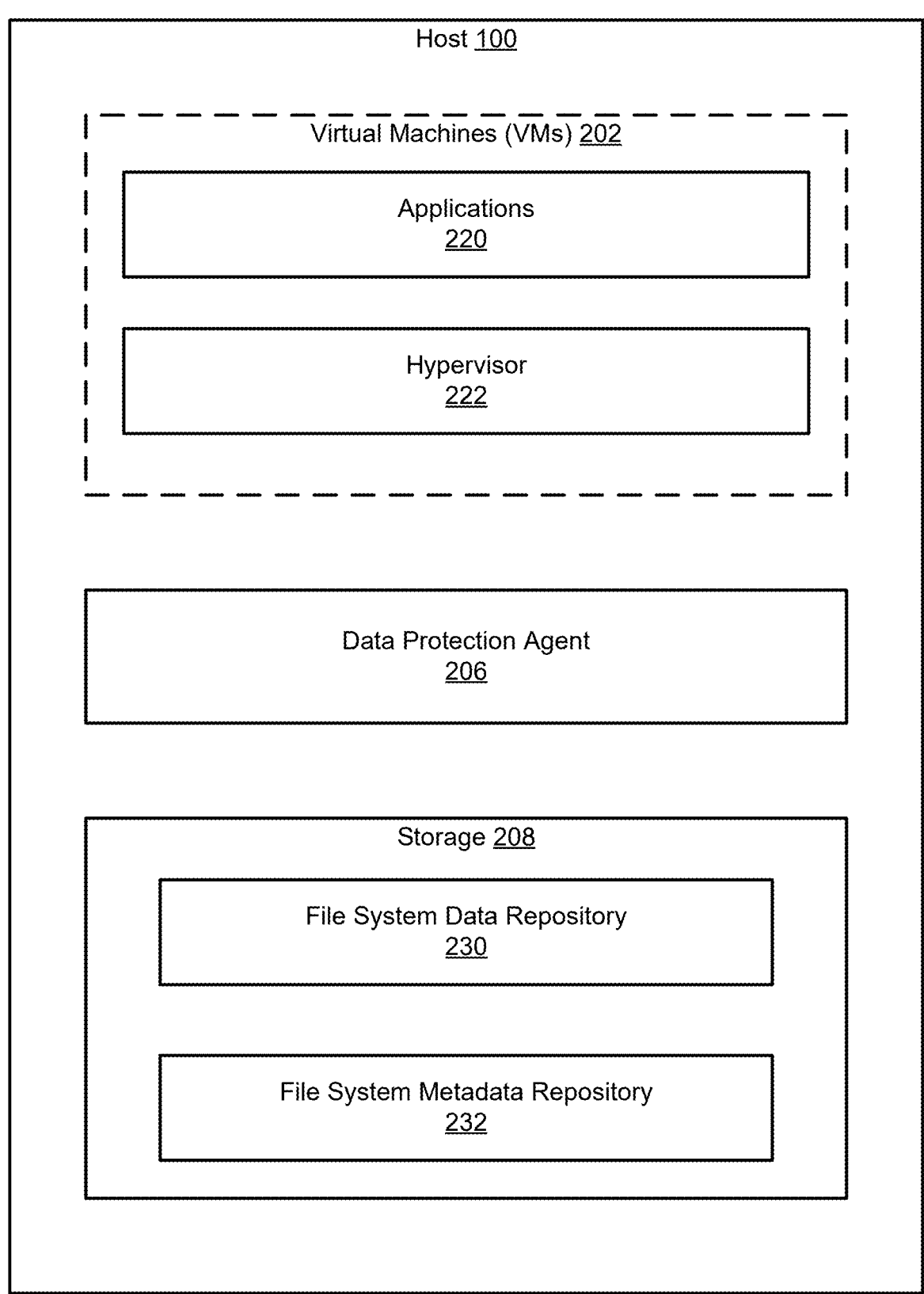
FIG. 2 shows a diagram of a host in accordance with one or more embodiments disclosed herein.

FIG. 2 shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include a virtual machine (202), a data protection agent (206), and storage (208). The host (100) may include other, additional, and/or fewer components without departing from embodiments disclosed herein. For example, the host may include multiple data protection agents if multiple applications require distinct backup generation functionalities. As yet another example, the host may include multiple virtual machines. Each of the aforementioned components of the host (100) is discussed below.

In one or more embodiments disclosed herein, the virtual machines (202) are implemented as computer instructions, e.g., computer code, stored on a storage (e.g., 208) that when executed by a processor of the host (100) causes the host (100) to provide the functionality of the virtual machine (202) described throughout this Detailed Description. The virtual machine may include the functionality to perform or otherwise provide computer implemented services to users. The virtual machine may include other and/or additional functionalities without departing from embodiments disclosed herein. The virtual machine may be managed by a hypervisor (222) (e.g., computing instructions executing on the host (100)). For example, the hypervisor may be a Hyper-V hypervisor. The hypervisor (222) may generate image backups (full and incremental) of VMs (202) executing on the host (100).

The virtual machine (202) may include one or more applications (220). Each application may be a portion of the computer instructions discussed above, which when executed by a processor of the host (100), causes the host (100) to perform a portion of the computer implemented services performed by the virtual machine (202). For example, a database application may perform database services, a word processing application may perform word processing services, and an electronic mail communication application may perform electronic mail communication services, etc.

In one or more embodiments disclosed herein, the data protection agent (206) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (206) described throughout this Detailed Description.

In one or more embodiments disclosed herein, the data protection agent (206) is implemented as computer instructions, e.g., computer code, stored on a storage (e.g., 108) that when executed by a processor of the host (100) causes the host (100) to provide the functionality of the data protection agent (206) described throughout this Detailed Description.

In one or more embodiments disclosed herein, the data protection agent (206) is implemented using one or more external computing devices. Although such an implementation is not shown in the systems of FIG. 1 or FIG. 2, the one or more computing devices may be operatively connected to the host (100) enabling the data protection agent (206) to remotely interact with the host (100). For additional information regarding computing devices, refer to the discussion above with respect to FIG. 1 or the discussion below with respect to FIG. 7.

In one or more embodiments, the data protection agent (206) may include the functionality to perform the aforementioned local data protection services of the host (100). To perform the local data protection services, the data protection agent (206) may obtain requests and information from the data protection manager (122, FIG. 1) and send and respond to commands between the backup storage (120, FIG. 1), the vault storage (130), and the virtual machine (202) and the applications (220). The sending and responding to the commands may result in the performance of all, or a portion, of the methods discussed in FIGS. 4-6.2. The commands may be associated with an Internet Protocol, such as, for example, Internet Small Computer Systems Interface (iSCSI). For additional information regarding the functionality of the data protection agent (206), refer to FIGS. 4-6.2.

In one or more embodiments, the storage (208) may be implemented using one or more volatile or non-volatile storages or any combination thereof. The storage (208) may include the functionality to, or otherwise be configured to, store and provide all, or portions, of information that may be used by the virtual machine (202), applications (220), and/or the data protection agent (206). The information stored in the storage (208) may include a file system data repository (230) and a file system metadata repository (232). The storage may include other and/or additional information without departing from embodiments disclosed herein. Each of the aforementioned types of information is discussed below.

In one or more embodiments disclosed herein, the applications (220) and/or users of the applications (220) generate data during the performance of computer implemented services. The data may be stored in a file system. In one or more embodiments disclosed herein, a file system is an organizational data structure that tracks how application data is stored and retrieved in a system (e.g., in storage (208) of the host (100), i.e., the file system data repository (230)). The file system may specify references to assets of applications and any asset data associated with each asset. An asset may be an individual data object in the file system. An asset may be, for example, an application (220), a virtual machine (202) or the entirety of the file system. Each asset may include any number of elements (e.g., sub-assets). The elements may be, for example, snapshots, backup images, folders and/or files associated with a virtual machine (e.g., 202). Each file may include file data. The file data may include, for example, database data, calendar data, electronic mail communications data, etc.

In one or more embodiments, the file system data repository (230) may include one or more data structures that may be used to generate backups. The file system data repository (230) may include file data generated by the applications (220) and/or users of the applications (220) as discussed above. The file data may be any type of data such as database data and email data generated by users of the applications (220) without departing from the embodiments disclosed herein. Each asset (e.g., VM (202), applications (220), or file system) may be associated with any number of sub-assets (e.g., files, snapshots, backup images, folders, etc.), each sub-asset may include any quantity of file data, and furthermore, each asset may include any number of elements without departing from embodiments disclosed herein. Users and/or applications (220) may use the file data of the file system data repository (230) when obtaining computer implemented services from the host (100). Additionally, the file data (e.g., backup-ready metadata) of the file system data repository (230) may be obtained and/or modified by the data protection agent (206) to generate backups, as described in further detail below in FIG. 4. The file data of the file system data repository (230) may be used by other and/or additional entities for other and/or additional purposes without departing from embodiments disclosed herein. Additionally, the file system data repository (230) may include other and/or additional types of information without departing from embodiments disclosed herein.

In one or more embodiments, the file system metadata repository (232) may include one or more data structures that include information regarding files included in the file system stored in the file system data repository (230). The information may include, for example, an entry for each file that includes: file identifiers associated with the file, the file length or size, one or more data runs associated with one or more data blocks of the file, data block identifiers associated with the one or more data blocks of the file, the creation date, the modification date, the asset identifier associated with the file, and a parent file or folder associated with the file. The file system metadata repository (232) may include other and/or additional information associated with the files stored in the file system data repository (230) (as discussed below in FIGS. 4-6.2) without departing from embodiments disclosed herein. The file system metadata repository (232) may be used by the users of the applications (220), virtual machines (202), and/or the data protection agent (206) during the performance of computer implemented services. The file system metadata repository (232) may be used by the data protection agent (206) to generate backups and backup metadata, as discussed below. The information included in the file system metadata repository (232) may be generated by the VM (202), applications (220), the host operating system, and/or users of the applications (220) during the performance of computer implemented services and stored in the file system metadata repository (232).

While the above data structures (e.g., 230, 232) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (208), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 3:
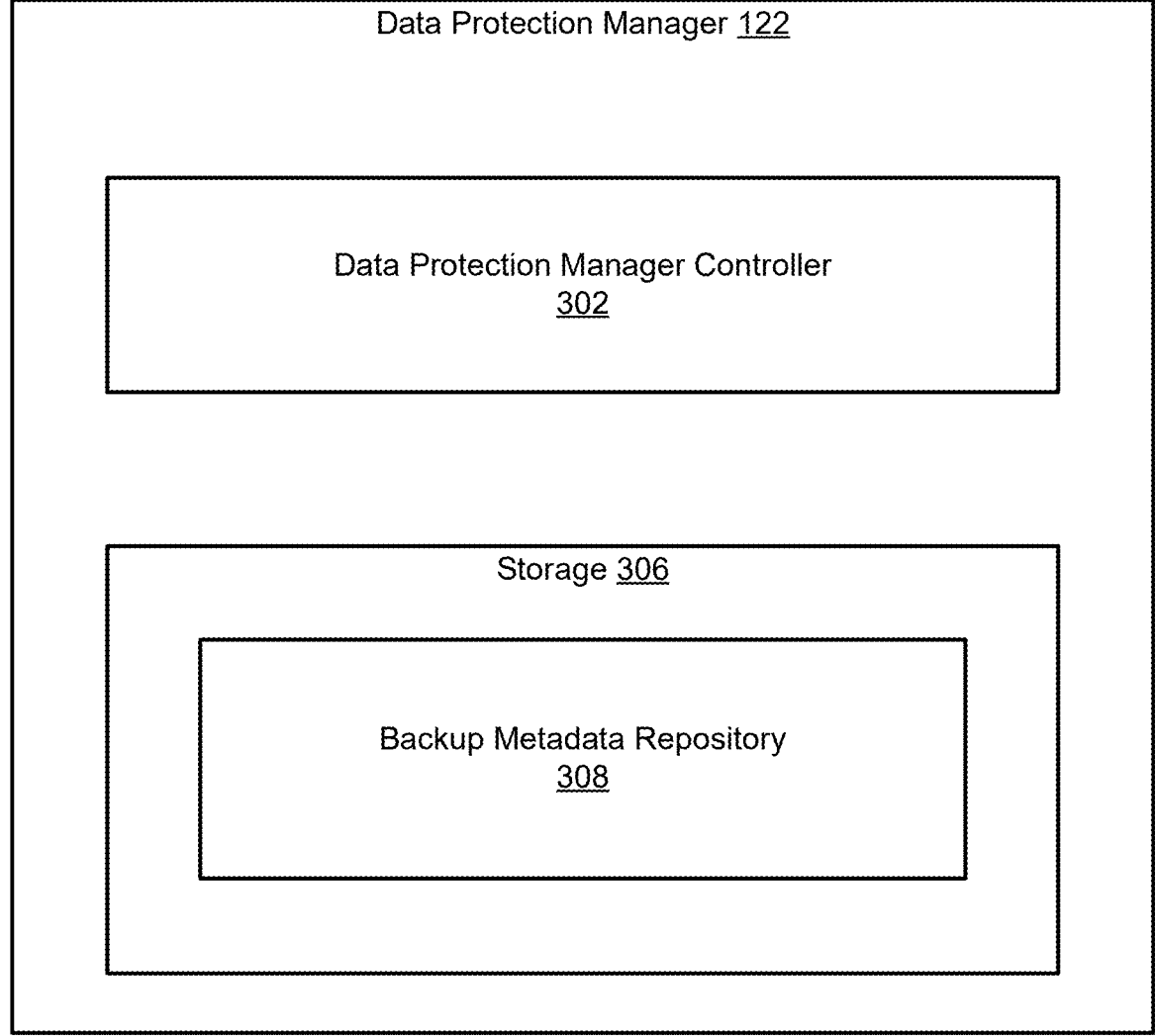
FIG. 3 shows a diagram of a data protection manager in accordance with one or more embodiments disclosed herein.

FIG. 3 shows a diagram of a data protection manager in accordance with one or more embodiments disclosed herein. The data protection manager (122) may be an embodiment of the data protection manager (122, FIG. 1 and/or 206, FIG. 2) discussed above. As discussed above, the data protection manager (122) may include the functionality to perform data protection management services. To perform the aforementioned services, the data protection manager (122) may include a data protection manager controller (302) and storage (306). The data protection manager (122) may include other, additional, and/or fewer components without departing from embodiments disclosed herein. Each of the aforementioned components of the data protection manager (122) is discussed below.

In one or more embodiments disclosed herein, the data protection manager controller (302) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (302) described throughout this Detailed Description.

In one or more embodiments disclosed herein, the data protection manager controller (302) is implemented as computer instructions, e.g., computer code, stored on a storage (e.g., 306) that when executed by a processor of the data protection manager (122) causes the data protection manager (122) to provide the functionality of the data protection manager controller (302) described throughout this Detailed Description.

In one or more embodiments, the data protection manager controller (302) may include the functionality to perform the aforementioned data protection management services. To perform the data protection management services, the data protection manager controller (302) may send requests and information to the data protection agent (206, FIG. 2) to initiate the generation of backups and backup access services. The data protection manager controller (302) may perform all, or a portion, of the methods discussed in FIGS. 4-6.2. For additional information regarding the functionality of the data protection manager controller (302), refer to FIGS. 4-6.2.

In one or more embodiments, the storage (306) may be implemented using one or more volatile or non-volatile storages or any combination thereof. The storage (306) may include the functionality to, or otherwise be configured to, store and provide all, or portions, of information that may be used by users of the system and the data protection agent (206, FIG. 2) to perform backup access services and/or other data protection services without departing from embodiments disclosed herein. The information stored in the storage (306) may include a backup metadata repository (308). The storage (306) may include other and/or additional information without departing from embodiments disclosed herein.

In one or more embodiments, the backup metadata repository (308) may include one or more data structures that include information regarding backups of the data generated on the host (100, FIG. 1). The information may include, for example, for each backup, a backup identifier, a backup generation timestamp, and a storage location included in the backup storage. The information may also include, for each file/asset in a backup: a file identifier associated with the file, a file name associated with the file, the file length or size, data runs, the asset identifier associated with the file, and a parent file or folder associated with the file. The information may further include application information associated with the backups such as an application identifier, an application name, and an application type (e.g., database application, a word processing application, etc.). The backup metadata repository (308) may include a backup-ready metadata database (discussed below in FIGS. 4-6.2) that includes any of the above-discussed metadata from the host that is associated with a backup image of a VM.

The backup metadata repository (308) may include other and/or additional information associated with backups of the data generated on the host (100, FIG. 1) without departing from embodiments disclosed herein. The backup metadata repository (308) may be used by the data protection agent (206, FIG. 2) during the performance of backup access services. The information included in the backup metadata repository (308) may be generated by the data protection agent (206, FIG. 2) during the backup generation and backup access services and stored in the backup metadata repository (308).

While the data structures and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (306), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 4:
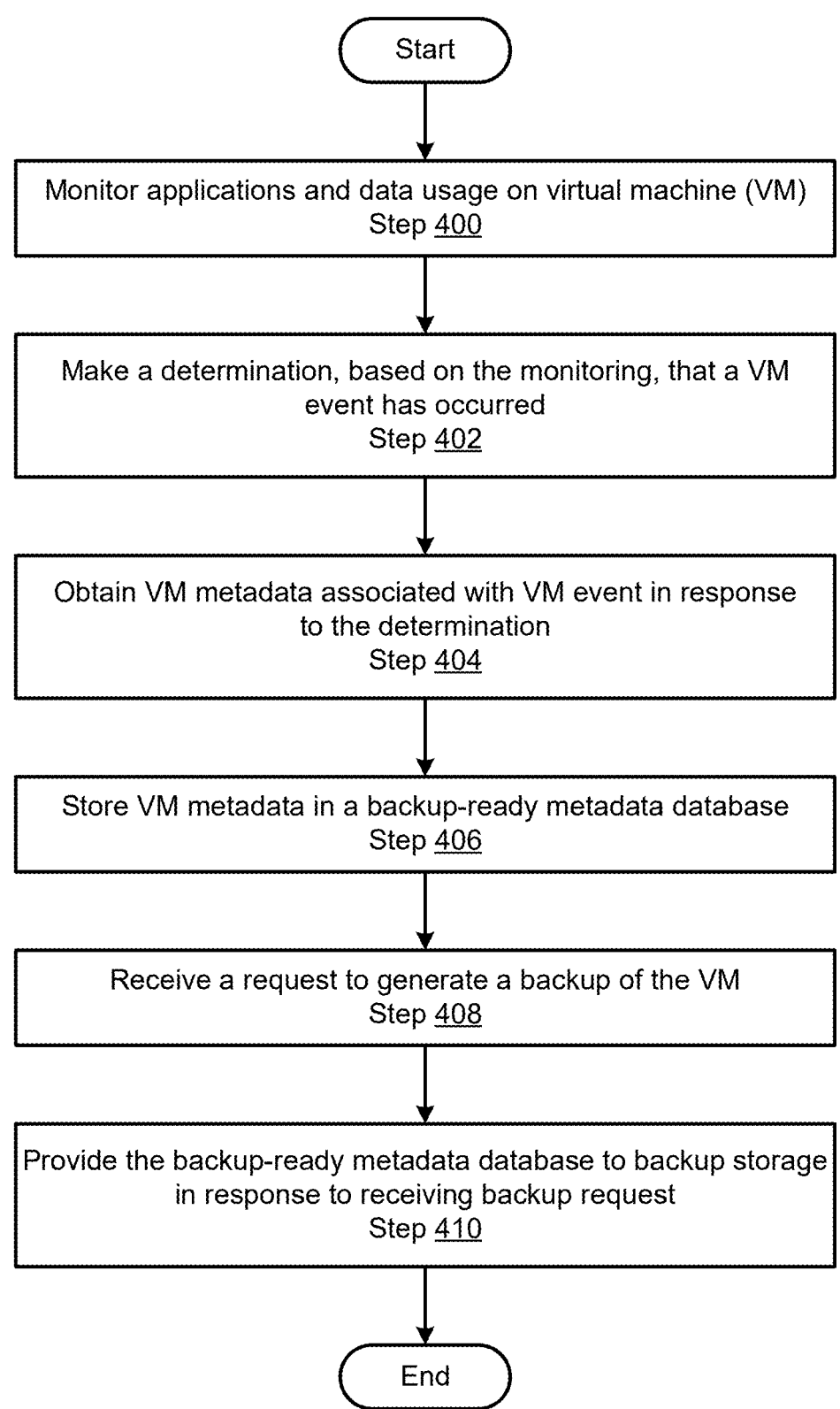
FIG. 4 shows a flowchart of a method for generating backup-ready metadata on a host in accordance with one or more embodiments disclosed herein.

FIG. 4 shows a flowchart of a method for monitoring applications and data usage within a virtual machine to generate metadata usable to logically split a backup image of the virtual machine. The method shown in FIG. 4 may be performed by, for example, a data protection agent (e.g., 206, FIG. 2). Other components of the system in FIGS. 1-3 may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 400, the data protection agent monitors applications and data usage on a virtual machine (e.g., 202, FIG. 2). In one or more embodiments, the data protection agent monitors for certain events to occur in association with the virtual machine, which may be considered a VM event. In one or more embodiments, the VM event includes any event in which an application changes a state, such as initiating, accessing data, writing data, interacting with other applications, terminating, or any other change in the usage of the application.

In Step 402, the data protection agent makes a determination, based on the monitoring in Step 400, that a VM event has occurred. Then, in Step 404, the data protection agent obtains VM metadata associated with the VM event in response to the determination in Step 402. In one or more embodiments, the VM metadata includes one or more of the following: application name, application identification, a list of files associated with the application, the starting and ending locations of each of the files associated with the application (e.g., a data run, length, etc.), how each of the files associated with the application are compiled, how the files associated with the application are stored, how the files associated with the application are restored, settings associated with the application, users associated with the application, a list of applications that the application interacts with, etc.

In one or more embodiments, a data run may be associated with a data of a file. The data may be stored as a span of data such as a data block. Each file may include one or more data blocks. A data run may include an offset and length. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Because the backup image may be stored according to the hierarchy of files included in the storage, the offset may be used to collect only a specifically requested file in the backup image. The offset may be derived from the backup image itself or from the file system metadata (e.g., the parent file identifiers and the size or lengths of each file). The offset may include other and/or additional information without departing from embodiments disclosed herein.

In one or more embodiments, lengths may refer to one or more data structures that specify where a data and/or portions of data (e.g., sectors, data blocks, etc.) of a file begin and end in the storage of the host and/or the backup storage. The lengths may be obtained by the data protection agent based on the file system metadata and/or the backup image. The lengths may be pointers that reference locations in a backup storage where a data block or portion of a data block of a backup begins and ends. The lengths may be used to identify and obtain specific files or portions of files. Each length may be associated with a data block or a portion of a data of a file. Each length may be mapped to, or otherwise associated with, a file identifier of a file in the file system. The lengths may include other and/or additional information and may be used for other and/or additional purposes without departing from embodiments disclosed herein.

In Step 406, the data protection agent stores or causes to store the VM metadata in a backup-ready metadata database. In one or more embodiments, the backup-ready metadata database is an embedded database such as SQLite. In one or more embodiments, the data protection agent creates checkpoints, such as a starting time and an ending time for Steps 400-406. In such a case, the backup-ready metadata database includes VM metadata only from between the starting time and ending time. In one or more embodiments, the checkpoints are aligned with other data protection events, such as creation of snapshots, full backups, etc.

In Step 408, the data protection agent receives a request to generate a backup image of the VM. In one or more embodiments, the data protection agent may obtain a request to generate a backup from the data protection manager (e.g., 122, FIG. 1). In one or more embodiments, the data protection agent is associated with multiple VMs and the request includes an identifier associated with the VM targeted by the backup request. In one or more embodiments, the request includes backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. The request may be provided to the data protection agent using any appropriate method of data transmission without departing from embodiments disclosed herein. For example, the data protection manager may transmit the request as a message that includes one or more network packets through one or more network devices that operatively connect the data protection agent to the data protection manager.

In one or more embodiments, the data protection manager may send the request based on a protection policy associated with the VM. The protection policy may be a data structure that specifies backup requirements (e.g., a backup schedule specifying points in time to generate backups, backup storage information associated with one or more backup storages to store the backup and/or portions of the backup, a retention period specifying an amount of time to keep the backup before deleting the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The backup generation request associated with the VM may be obtained via other and/or additional methods without departing from embodiments disclosed herein.

In Step 410, the data protection agent provides the backup-ready metadata database to the backup storage in response to the request received in Step 408 and as part of providing a backup image to the backup storage. In one or more embodiments, as part of the providing, a backup image of the VM is generated. In one or more embodiments, the data protection manager may use any appropriate backup image generation technique without departing from embodiments disclosed herein. In one embodiment, the data protection agent may generate the backup image. In an alternative embodiment, the data protection agent may initiate the generation of the backup image by one or more other entities or services (e.g., Volume Shadow-Copy Service (VSS), Logical Volume Manager, etc.). The backup image may be stored locally within a storage of the host. The backup image may be reflected in the file system data and file system metadata of the host. The backup image of the VM may be generated via other and/or additional methods without departing from embodiments disclosed herein.

In one or more embodiments, the provision of the backup-ready metadata database also includes, prior to sending the backup-ready metadata database to a backup storage: (i)

parsing the backup image to identify and retrieve metadata contained within the backup image and (ii) appending the backup-ready metadata database with the metadata retrieved from the backup image. In one or more embodiments, doing so may provide information regarding the use of the applications in the VM and also details regarding where the applications and associated data are located within the backup image itself. As such, a more detailed and focused analysis may be performed on the backup image after it is sent to the backup storage.

In one or more embodiment, the method ends following Step 410.

Figure 5:
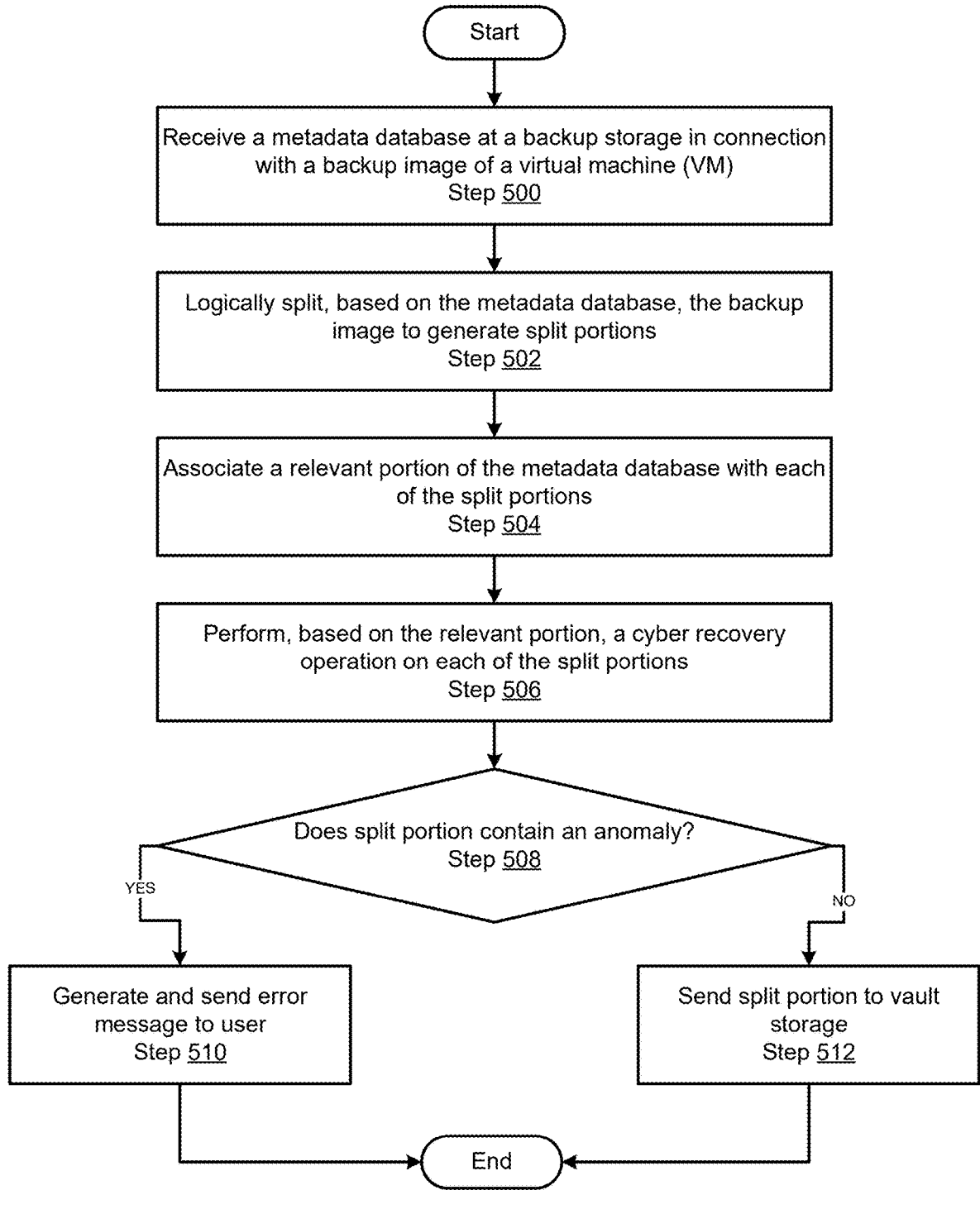
FIG. 5 shows a flowchart of a method for splitting backup images of virtual machines in accordance with one or more embodiments disclosed herein.

FIG. 5 shows a flowchart of a method for logically splitting a backup image of a VM and performing a cyber recovery operation on the logically split portions in accordance with one or more embodiments disclosed herein. The method shown in FIG. 5 may be performed by, for example, a data protection manager (e.g., 122, FIG. 3). Other components of the system in FIGS. 1-3 may perform all, or a portion, of the method of FIG. 5 without departing from the scope of the embodiments described herein. While FIG. 5 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 500, the data protection manager receives a metadata database at a backup storage in connection with a backup image of a VM. In one or more embodiments, the metadata database is the same as the backup-ready metadata database provided in Step 410 above.

In Step 502, the data protection manager logically splits the backup image to generate multiple split portions using the metadata database. In one or more embodiments, the backup image of the VM is seen as a single file by the backup storage and may be in a VHD or VHDX format. In one or more embodiments, the logical splitting includes determining which applications and associated data should be grouped together by utilizing the metadata database to identify which applications interact with each other, which data is used by which applications and whether there is any commonality between the data used by different applications, how often an application utilizes certain data, etc. Further, the metadata database also provides the location, name, offsets, and size of different data contained within the backup image, all of which can be used to logically split the backup image. In one or more embodiments, the criteria for the logical splitting may be set by a user. In one or more embodiments, the criteria for the logical splitting is based on the types of cyber recovery operations that are available. For example, if a cyber recovery operation is customized for a certain type of data or type of application, the backup image may be logically split to include a portion that matches the customization of the cyber recovery operation.

In another example, it may be useful to logically split the backup image into a number of smaller portions while only ensuring that data associated with a file or an application is not split amongst multiple portions. For example, each application and each file remains un-split, while the backup image as a whole is split into many portions. In such a case, if only a subset of the portions are found to not be usable for recovery purposes, then the backup image as a whole is not compromised because some other portions may be found to be usable for recovery purposes. Further, the portions that are usable contain whole applications and files, which are then able to be used after a recovery operation is performed.

In a non-limiting, a first application and a second application may both access the same data. In such an example, the data protection manager could identify this commonality and split the backup image such that the portions associated with the first application, the second application, and the common data are in a single logically split portion. In one or more embodiments, this process of logically splitting is iterated until one of the following are achieved: all of the criteria for splitting are performed, all of the portions of the backup image have been analyzed and split into a portion, or until a threshold number of portions are achieved.

In Step 504, the data protection manager associates a relevant portion of the metadata database with each of the split portions. In one or more embodiments, this includes logically splitting the metadata database. In one or more embodiments, the associated portions of the metadata database may be useful in performing cyber recovery operations and is thus linked to the split portion for further functionality.

In Step 506, the data protection manager performs or causes to perform a cyber recovery operation on one or more of the split portions. A cyber recovery operation includes any operation that analyzes the integrity of a set of data, such as the portion of the backup image. In one or more embodiments, the cyber recovery operation is a relatively simple operation that is performed by the data protection manager itself. In one or more embodiments, the cyber recovery operation is performed by another manager, agent, or device altogether, and the results of the cyber recovery operation are provided back to the data protection manager.

In one or more embodiments, the type of cyber recovery operation is based on the portion of the backup image. As discussed above, the type of cyber recovery operation may operate as a basis for the logical splitting of the backup image. In such a scenario, a first cyber recovery operation may be performed on a first logically split portion and a second cyber recovery operation may be performed on a second logically split portion. Further, each portion may undergo more than one cyber recovery operation.

In Step 508, the data protection manager determines whether the split portion contains an anomaly. If the data protection manager does determine that a split portion contains an anomaly, the method continues to Step 510. If the data protection manager determines that a split portion does not contain an anomaly, the method continues to Step 512.

In Step 510, the data protection manager generates and send an error message to the user. In one or more embodiments, the error message includes any one of the following details: an anomaly was identified in the backup image, the portion of the backup image for which the anomaly was detected, the application(s) and/or file(s) associated with the anomalous portion of the backup image, a reason why the anomalous portion was identified, a severity of the anomaly, and options for the user to take additional actions, such as removal of the portion from the copy of the backup image, quarantining the portion of the backup image, or erasing the portion of the backup image. In one or more embodiments, the data protection manager also tags (e.g., by appending the metadata associated with the split portion with an anomalous or abnormal tag) the split portion such that the anomalous portion of the backup image may be readily identified by other managers, agents, devices, etc.

In one or more embodiments, the method ends following Step 510.

In Step 512, the data protection manager sends the split portion to a vault storage. In one or more embodiments, the metadata associated with the split portion found not to contain any anomalies is tagged (e.g., by appending the metadata associated with the split portion with a clean or non-anomalous tag) prior to sending the split portion to the vault storage. In one or more embodiments, the data protection manager waits until all portions of the backup image have been analyzed in Step 508 before sending the non-anomalous portions to the vault storage. As discussed above, the vault storage includes a long-term and/or more secure storage solution.

In one or more embodiments, the method ends following Step 512.

FIG. 6.1 shows a flowchart of a method for performing cyber recovery operations in accordance with one or more embodiments disclosed herein. The method shown in FIG. 6.1 may be performed by, for example, a data protection manager (e.g., 122, FIG. 3). Other components of the system in FIGS. 1-3 may perform all, or a portion, of the method of FIG. 6.1 without departing from the scope of the embodiments described herein. While FIG. 6.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 600, the data protection manager receives a metadata database at a backup storage in connection with a backup image of a VM. In one or more embodiments, the metadata database is the same as the backup-ready metadata database provided in Step 410 above.

In Step 602, the data protection manager determines that a portion of the backup image contains an anomaly based on the metadata database. More details relating to how the data protection manager makes this determination may be found in referent to FIG. 5 above.

In Step 604, the data protection manager erases and rewrites the portion of the backup image using a predetermined pattern to obtain a modified backup image. In one or more embodiments, the metadata associated with the portion of the backup image provides a starting location and an ending location, or multiple starting and ending locations in case the portion is not contiguous in the backup image, of the portion within the backup image. Further, in one or more embodiments, the erase and rewrite steps may be considered a single step in which the current data is overwritten with the new predetermined pattern of data or may include multiple steps. Further, the portion of the backup image may be erased and rewritten any number of times to ensure complete erasure of the data that was determined to be anomalous.

In one or more embodiments, the predetermined pattern may be any suitable pattern that may be identified at a later time. In one or more embodiments, the data is stored as bits (i.e., 1s and 0s) and the pattern may be all of one type of bit (e.g., all 0 or all 1) or a mixture of different bits and may be any number of bits in length before repeating. In one or more embodiments, the rewriting of the data is performed using the same overall data structure included within the portion of the image backup such that only the content is changed and not the structure, such that the rewritten portion of the backup image does not negatively impact other portions of the backup image.

In Step 606, the data protection manager stores details regarding the erasure and rewriting in the metadata database. In one or more embodiments, the details include the starting and ending locations of the rewritten portion of the backup image, the pattern used to perform the rewriting, processes used to perform the erasing and rewriting, and any other pertinent details regarding the erasure and rewriting of the portion of the backup image. As such, at this point, for an erased and rewritten portion of the backup image, the metadata database may include details regarding what was stored in the portion, how the data was used, why it was considered anomalous, and how it was erased and rewritten. In one or more embodiments, the data protection manager sends the metadata database and the modified backup image to a vault storage, as described above.

In Step 608, the data protection manager receives a request to initiate a recovery operation for the VM for a host (e.g., 100, FIG. 2). The recovery request may include one or more backup image identifiers and a VM identifier to enable the specific backup image being requested to be identified by the data protection manager. In one or more embodiments, the request is received directly from the host or is received from a separate location that identifies the host as the target for the recovery operation.

In Step 610, the data protection manager provides the metadata database and the modified backup image to the host identified in the request in Step 608. In one or more embodiments, the metadata database and the modified backup image are stored together and such storage may be local to the data protection manager or remote to the data protection manager (e.g., in the vault storage). In one or more embodiments, the metadata database and the modified backup image are stored across multiple devices and/or locations. In any case, the data protection manager sends a request to the relevant locations to cause the metadata database and the modified backup image to be sent to the identified host.

In one or more embodiments, the method ends following Step 610.

FIG. 6.2 shows a flowchart of a method for performing a VM recovery operation in accordance with one or more embodiments disclosed herein. The method shown in FIG. 6.2 may be performed by, for example, a data protection agent (e.g., 206, FIG. 2). Other components of the system in FIGS. 1-3 may perform all, or a portion, of the method of FIG. 6.2 without departing from the scope of the embodiments described herein. While FIG. 6.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 620, the data protection agent sends a request to the data protection manager (e.g., 122, FIG. 3) to initiate a recovery operation of a VM on a host (e.g., 100, FIG. 2). The recovery request may include one or more backup image identifiers and a VM identifier to enable the specific backup image being requested to be identified by the data protection manager.

In Step 622, the data protection agent and/or the host receives a backup image of the VM and a metadata database associated with the backup image from a backup storage and/or the data protection manager. FIG. 6.1 above provides more information on the sourcing and modifications made to the backup image and metadata database. In addition, if the VM that is being restored is currently operating, it must be shut down before the backup image can be used to restore the VM.

In Step 624, the data protection agent determines whether the backup image is mountable. In one or more embodiments, the data protection agent parses the metadata database to determine which portions of the backup image were found to be anomalous and determines the contents of the anomalous portions. In some circumstances, it is possible that the portion of the backup image that is used for mounting the backup image was found to be anomalous and is no longer usable. In such a circumstance, the backup image would not be mountable in its current state and would be considered not mountable. If the backup image is determined to be mountable, the method continues to Step 626. If the backup image is determined not to be mountable, the method continues to Step 630.

In Step 626, the data protection agent mounts the backup image. In Step 628, the data protection agent parses the backup image and performs a recovery operation based on the metadata database. In one or more embodiments, the data protection agent is able to identify the portions of the backup image that were found to be anomalous, which may be accomplished by the data protection agent identifying the predetermined patterns discussed above or by identifying other markers that indicate portions that are anomalous (e.g., via tags, a lookup table, etc.). In one or more embodiments, the data protection agent is able to identify these anomalous portions by receiving instructions separately or by identifying the instructions contained within the metadata database or backup image itself.

For portions of the backup image that are considered normal, or not anomalous, the data protection agent restores that portion of the backup image as is known. For portions of the backup image that are considered anomalous or abnormal, the data protection agent does not restore that portion of the backup image. In one or more embodiments, the data protection agent may perform the above identification in an iterative manner (e.g., by parsing a portion of the backup image and then restoring that portion in accordance with the above and then moving on to the next portion of the backup image and so on until the entirety of the backup image has been parsed and restored). In one or more embodiments, the data protection agent parses the entirety of the backup image first before performing the restoration in accordance with the above discussion.

In one or more embodiments, the data protection agent confirms that the recovery operation has been completed and send a confirmation to the host and/or to a user that the recovery operation has been completed.

In one or more embodiments, the method may end following Step 628.

In Step 630, the data protection agent creates a mountable wrapper for the backup image to generate a wrapped backup image. In one or more embodiments, the data protection agent creates a wrapper that is mountable, but otherwise has minimal or no other content. In one or more embodiments, this "empty" wrapper may be viewed as a new backup image that has no content. Then, or concurrently with creating the wrapper, depending on the formats utilized, the data protection agent includes the backup image as the content of the mountable wrapper, which thereby enables the data protection agent to access the contents contained within the backup image.

In Step 632, the data protection agent mounts the wrapped backup image. In Step 634, the data protection agent parses the backup image contained within the wrapper and performs a recovery operation based on the metadata database. In one or more embodiments, the data protection agent is able to identify the portions of the backup image that were found to be anomalous, which may be accomplished by the data protection agent identifying the predetermined patterns discussed above or by identifying other markers that indicate portions that are anomalous (e.g., via tags, a lookup table, etc.). In one or more embodiments, the data protection agent is able to identify these anomalous portions by receiving instructions separately or by identifying the instructions contained within the metadata database or backup image itself.

For portions of the backup image that are considered normal, or not anomalous, the data protection agent restores that portion of the backup image as is known. For portions of the backup image that are considered anomalous or abnormal, the data protection agent does not restore that portion of the backup image. In one or more embodiments, the data protection agent may perform the above identification in an iterative manner (e.g., by parsing a portion of the backup image and then restoring that portion in accordance with the above and then moving on to the next portion of the backup image and so on until the entirety of the backup image has been parsed and restored). In one or more embodiments, the data protection agent parses the entirety of the backup image first before performing the restoration in accordance with the above discussion.

In one or more embodiments, the method may end following Step 634.

The above methods described in FIGS. 6.1 and 6.2 enable a backup image of a virtual machine to be used even in the situation in which a portion of the backup image is not usable (e.g., is found to be anomalous), which in turn provides a higher degree of security of data.

Figure 7:
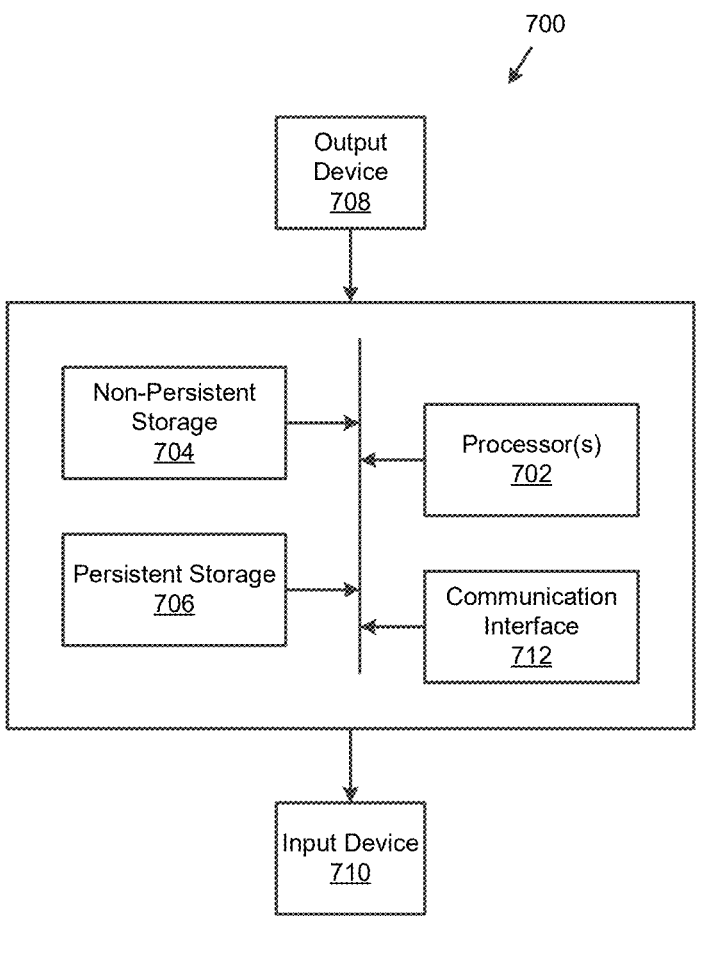
FIG. 7 shows a diagram of a computing device in accordance with one or more embodiments disclosed herein.

As discussed above, embodiments disclosed herein may be implemented using computing devices. FIG. 7 shows a diagram of a computing device in accordance with one or more embodiments disclosed herein. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment disclosed herein, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment disclosed herein, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an identifier may refer to a unique combination of alphanumeric characters associated with an entity that specifies that particular entity. The identifier may be local (usable by a single component) or global (usable by all components).

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments disclosed herein should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While the embodiments have been described above with respect to a limited number of embodiments, those skilled in the art, having the benefit of this disclosure, will appreciate that other embodiments can be devised which do not depart from the scope of the embodiments disclosed herein. Accordingly, the scope of the embodiments disclosed herein should be limited only by the attached claims.

What is claimed is:

1. A method for enhancing backup and recovery of a virtual machine, comprising:

receiving, in connection with a backup operation, a metadata database and a backup image of the virtual machine;

making a first determination, based on the metadata database, that a portion of the backup image comprises an anomaly;

rewriting, in response to the first determination, the portion of the backup image to obtain a modified backup image;

storing rewrite details in the metadata database to obtain a modified metadata database;

after the storing:

receiving a request to initiate a recovery operation for a host;

providing the modified backup image and the modified metadata database to the host;

making a second determination that the modified backup image is not mountable;

in response to the second determination, creating and attaching a mountable wrapper for the modified backup image;

mounting, at the host and using the mountable wrapper, the modified backup image; and performing a recovery operation for the virtual machine on the host using the modified metadata database and the modified backup image.

2. The method of claim 1, wherein the rewriting comprises:

rewriting the portion of the backup image with a pre-determined pattern of bits.

3. The method of claim 2, wherein the pre-determined pattern comprises a combination of 0 and 1 bits.

4. The method of claim 2, wherein the rewrite details comprise a start location of the portion of the backup image, an end location of the portion of the backup image, and the pre-determined pattern of bits.

5. The method of claim 4, wherein the rewrite details further comprise a type of the anomaly.

6. The method of claim 4, wherein performing the recovery operation comprises:

identifying the portion of the backup image in the modified backup image based on the rewrite details in the modified metadata database; and skipping, based on the identifying, recovery of the portion of the backup image.

7. The method of claim 1, wherein the first determination comprises:

determining that the first portion of the backup image does not comprise file system data.

8. A non-transitory computer readable medium (CRM) comprising computer readable program code, which when executed by a computer processor, enables the computer processor to perform a method for efficient backup and recovery of a virtual machine, the method comprising:

receiving, in connection with a backup operation, a metadata database and a backup image of the virtual machine;

making a first determination, based on the metadata database, that a portion of the backup image comprises an anomaly;

rewriting, in response to the first determination, the portion of the backup image to obtain a modified backup image;

storing rewrite details in the metadata database to obtain a modified metadata database;

receiving a request to initiate a recovery operation for a host;

providing the modified backup image and the modified metadata database to the host;

making a second determination that the modified backup image is not mountable;

in response to the second determination, creating and attaching a mountable wrapper for the modified backup image;

mounting, at the host and using the mountable wrapper, the modified backup image; and performing a recovery operation for the virtual machine on the host using the modified metadata database and the modified backup image.

9. The non-transitory CRM of claim 8, wherein the rewriting comprises:

rewriting the portion of the backup image with a pre-determined pattern of bits.

10. The non-transitory CRM of claim 8, wherein the pre-determined pattern comprises a combination of 0 and 1 bits.

11. The non-transitory CRM of claim 8, wherein the rewrite details comprise a start location of the portion of the backup image, an end location of the portion of the backup image, and the pre-determined pattern of bits.

12. The non-transitory CRM of claim 8, wherein the rewrite details further comprise a type of the anomaly.

13. The non-transitory CRM of claim 8, wherein the first determination comprises:

determining that the first portion of the backup image does not comprise file system data.

*     *     *     *     *